W. P. BARKER.
Grain Binder.
No. 37,123.   Patented Dec. 9, 1862.
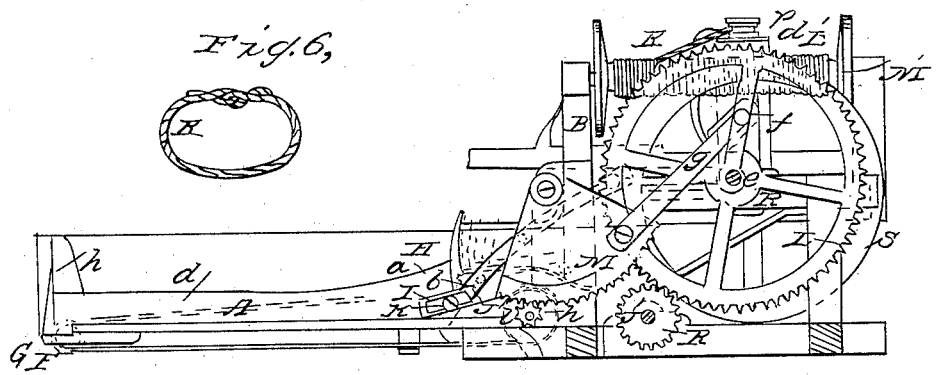
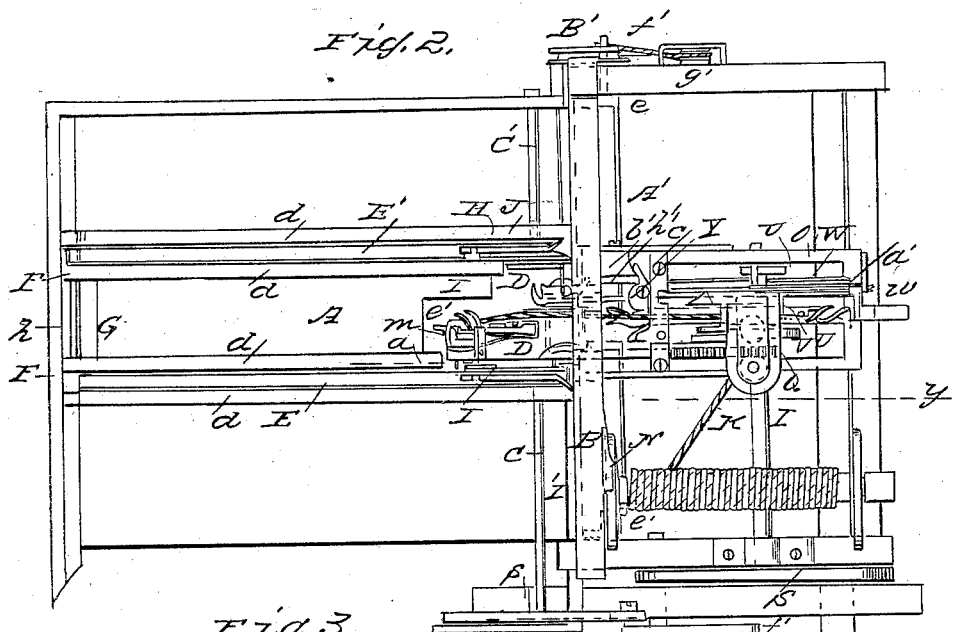
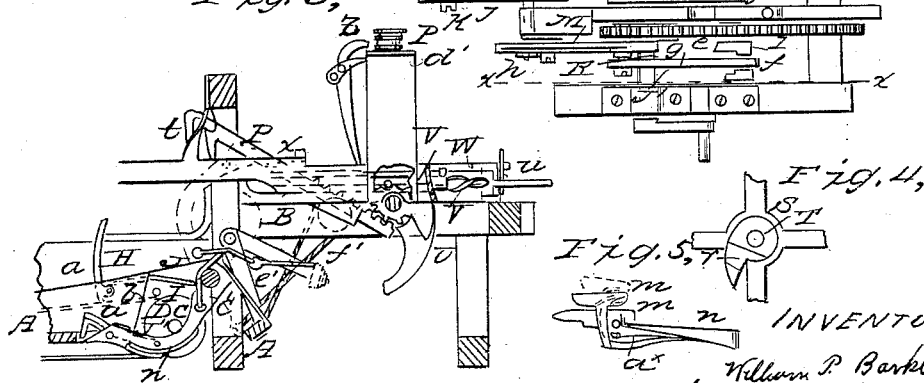
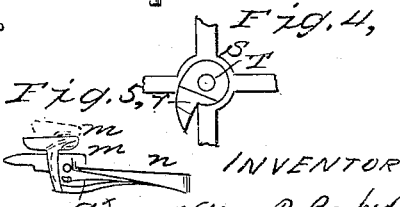
WITNESSES:
INVENTOR.
William P. Barker
per Munn & Co
attorneys

UNITED STATES PATENT OFFICE.

WILLIAM P. BARKER, OF GRAND RAPIDS, MICHIGAN, ASSIGNOR TO HIMSELF, JAMES VAN BUREN, AND NELSON BURCHARD, OF SAME PLACE.

IMPROVEMENT IN GRAIN-BINDERS.

Specification forming part of Letters Patent No. 37,123, dated December 9, 1862.

*To all whom it may concern:*

Be it known that I, WILLIAM P. BARKER, of Grand Rapids, in the county of Kent and State of Michigan, have invented a new and Improved Machine for Binding Grain; and I do hereby declare that the following is a full, clear, and exact description of the same, reference being had to the accompanying drawings, making a part of this specification, in which—

Figure 1 is a side sectional view of my invention taken in the line $x\ x$, Fig. 2; Fig. 2, a plan or top view of the same; Fig. 3, a side sectional view of a portion of the same taken in the line $y\ y$, Fig. 2; Figs. 4 and 5, detached views of portions of the same; Fig. 6, a detached view of a band, showing the knot tied by my invention.

Similar letters of reference indicate corresponding parts in the several figures.

The object of this invention is to obtain a device for binding grain which may be connected to and arranged to operate in conjunction with an ordinary reaper, so that the grain as cut by the reaper may be gathered into gavels and bound into sheaves, the latter being discharged from the machine, and the whole work performed automatically, and operated by the draft movement of the machine.

To enable those skilled in the art to fully understand and construct my invention, I will proceed to describe it.

A represents the platform, and B the main frame, of a reaper, and C C' are two shafts which are placed in line with each other at the inner end of the platform, near its junction with the main frame B. On the inner end of each shaft C C' there is placed a pulley, D, and around these pulleys endless belts, E E', respectively pass. Said belts are also passing around pulleys F F on a shaft G, at the outer end of the platform. Each belt E E' is provided with a hook, H, which is fitted at its lower end in a socket, I, by a pivot, $a$, as shown more particularly in Fig. 3. These sockets are attached to the belts, and each socket has a catch, $b$, fitted in its lower part. These catches are simply short levers secured in the sockets by fulcrum-pins $b$, and when the hooks are elevated, retaining them in that position by bearing against their lower ends. Each socket I has a spring or elastic plate, J, attached to it, and these springs project forward some distance in front of the sockets.

The platform A has four vertical ledges, $d$, attached to its upper surface, two for each belt E E', and these ledges serve as guides for the sockets I. The belts E E' do not have a continuous movement, but a reciprocating one, and are operated from a continuous rotating shaft, J', as follows: On said shaft J' there is a pinion, K, which gears into a large toothed wheel, L, the shaft $e$ of which is provided with two cranks, $f\ f'$, one of which, $f$, has one end of a connecting-rod, $g$, attached to it, the opposite end of said rod being connected to a toothed segment, M, which gears into a pinion, $h$, on the outer end of the shaft C. The crank $f$ and connecting-rod $g$ communicate a vibratory motion to the segment M, and the latter, of course, communicates a reciprocating motion to the belts E E', the belt E' being operated from shaft G, which shaft is operated from the shaft C by the belt E. Both belts E E' are moved simultaneously.

The hooks H, when they move towards the shafts C C', have an upright position, but when they move in the reverse direction they have a horizontal position, the hooks being released from the catches $b\ b$ by the action of the pulleys D, which, as the sockets press upon them, force inward the front ends of said catches, and thereby throw down the back ends free from the lower ends of the hooks. As the hooks approach the termination of their outward movement they come in contact with an upright ledge or plate, $h$, at the outer end of the platform, and the hooks are raised to a vertical position, and retained in that position by the catches $b$ while traveling over the platform A in the direction toward the shafts C C'.

I' represents a rock-shaft, which extends the whole length of the main frame, and parallel with the shafts C C'. This rock-shaft is operated from the crank $f'$ of shaft $e$, said crank being connected by a rod, $i$, with an arm, $j$, which projects from the shaft I', the rod $i$ being connected to the arm $j$ by means of a pin, $k$, which passes through a slot, $l$, in the outer part of the arm. (See Fig. 1.)

On this shaft I' there is placed a curved arm,

J″, which is provided at its end with nippers m m′. These nippers work on a pin or pivot, n, and are retained in proper position by a spring, o. One of the nippers, m′, has a lateral movement allowed it, so that it may grasp the cord or rope K of which the bands are formed. This cord or rope K is wound on a spool or drum, L′, which is placed on a shaft, M′, in the main frame A, and in a position at right angles to the shafts C C′ and I′. The spool or drum L′, is prevented from casually turning by means of a spring, N, pressing upon it at one end. The cord or rope K passes from the spool or drum L′ between anti-friction or guide-pulleys p p, and thence down over a stationary guide, q, to the nippers m m′.

O represents a framing, which is placed on the upper part of the main frame A, and has a rack-bar, P, fitted obliquely in it. This rack-bar gears into a pinion, Q, on a shaft, R, in the main frame, which shaft R is parallel with the shaft I′, and has a fly-wheel, S, on its outer end. The wheel S is provided with a cam, T, at its center, said cam having a slot, r, made in it, through which a pin, s, on the connecting-rod i passes at a certain period of its movement. The form of the cam T is shown clearly in Fig. 4. The outer or front end of the rack-bar P is provided with a pendent fork, t, into which a pin, u, at the outer end of the curved arm J″ passes, just before the latter reaches the termination of its forward movement, and the arm J″ is thereby made to actuate the rack-bar P, both at the forward and backward movement of the former, and the rack bar P rotates the shaft R first in one direction and then in the other.

On the shaft R there are placed two cams, U U′, one of which, U, shoves forward a shaft, V, during one movement of the shaft R, and the other cam, U′, shoves forward a shaft, W, during the other movement of shaft R. The shaft V has a screw, v, at its back part, on which a fork, w, at the back part of the shaft W, fits, and when the shaft W is shoved forward the shaft V is rotated in consequence of the fork w working on the screw v. The shaft W is brought back to its original position by a spring, a′, and the shaft V is brought back by the same means.

To the shaft W there is attached a cutter, X, which is of V form, and to the front end of shaft W there is pivoted a hook, Y, which is operated or turned on its pivot in consequence of its back end catching behind a projection, b′, in the framing O.

Z is a clamp, which is formed of a pendent bar pivoted to the plate d′, on which the anti-friction or guide pulleys p p are placed.

A′ is a bar, the ends of which are provided with arms e′ e′, which are pivoted to the main frame B. This bar extends the whole length of the main frame, and it is operated by a cam, B′, at one end of shaft I′, said cam having a cord, f′, attached to it, which passes around a pulley, g′, and is connected to the bar A′. (See Fig. 3.) The bar A′ has an elastic band, $C^\times$, attached to it, said band being also attached to the arm J″ at its end.

As the machine is drawn along, the hooks H H gather the cut grain and convey it to the arm J″ and deposit it therein, the arm J″ being down, or depressed, when the hooks reach it. The arm J″ then rises with the grain, the rope or cord K being grasped by the nippers m m′, and the grain being upon it, and when the arm J″ nearly reaches the termination of its upward movement the shaft V is thrown forward, and a fork, h′, at the front of said shaft catches the cord or rope K, and the latter is shoved forward and tucked under the band which encircles the sheaf, and the shaft V is then rotated by the forward movement of the shaft W and the twist given it, so as to form a knot, as shown in Fig. 6. The knife or cutter X then cuts the cord or rope K. The hook Y as it moves forward takes the cord or rope out from the nippers m m′, and carries it under and past the other part of the cord or rope. The elastic band $C^\times$ holds the sheaf, said band being distended and stretched by the movement of the bar A′ under the action of the cam B′ and cord f′. This band, owing to its elasticity, will accommodate itself to any-sized sheaf. The sheaf is discharged when the arm J″ drops and the bar A′ falls.

This device operates automatically with the other parts of the reaper. The shaft R is prevented from casually turning, and the shaft V from sliding or rising while being turned, in consequence of the pin s of the connecting-rod i bearing on the cam T of wheel S. The clamp Z holds the cord or rope K while the operation of tying the knot and cutting the cord is being performed, and the nippers m m′ are opened to release the cord by a pin, $a^\times$, on nipper m′ coming in contact with an oblique projection on the guide q.

Having thus described my invention, what I claim as new, and desire to secure by Letters Patent, is—

1. The traveling or reciprocating hooks H H attached to the endless belts E E′, in combination with the arm J″, provided with the nippers m m′ and the elastic band $C^\times$, attached to the bar A′ and arm J″, all arranged to operate as and for the purpose set forth.

2. The shafts V W, the former being provided with the screw v, fork h′, and the latter provided with the hook Y, knife or cutter X, and the fork w, said shafts being operated as shown, and in connection with the arm J″ and the cord or rope K, for the purpose specified.

3. The combination of the hooks H H, arm J″, provided with the nippers m m′, elastic band $C^\times$, shafts V W, and the cord or rope K, all combined and arranged to operate as and for the purpose herein set forth.

WILLIAM P. BARKER.

Witnesses:
DANIEL KELLY,
F. B. DAY.